(12) United States Patent
Wang et al.

(10) Patent No.: US 11,415,035 B2
(45) Date of Patent: Aug. 16, 2022

(54) DIESEL ENGINE HIGH PRESSURE SCR VENTILATION AND PRESSURE STABILIZATION SYSTEM

(71) Applicant: SHANGHAI MARINE DIESEL ENGINE RESEARCH INSTITUTE, Shanghai (CN)

(72) Inventors: Zhigang Wang, Shanghai (CN); Xiangli Zhu, Shanghai (CN); Xiaobo Li, Shanghai (CN); Teng Shen, Shanghai (CN); Qiuyan Chen, Shanghai (CN); Feixiang Shen, Shanghai (CN)

(73) Assignee: SHANGHAI MARINE DIESEL ENGINE RESEARCH INSTITUTE, Shanghai (CN)

( * ) Notice: Subject to any disclaimer, the term of this patent is extended or adjusted under 35 U.S.C. 154(b) by 0 days.

(21) Appl. No.: 17/435,962

(22) PCT Filed: Mar. 4, 2020

(86) PCT No.: PCT/CN2020/077733
§ 371 (c)(1),
(2) Date: Sep. 2, 2021

(87) PCT Pub. No.: WO2020/177707
PCT Pub. Date: Sep. 10, 2020

(65) Prior Publication Data
US 2022/0145788 A1    May 12, 2022

(30) Foreign Application Priority Data
Mar. 4, 2019 (CN) .......................... 201910160976.8

(51) Int. Cl.
*F01N 3/20* (2006.01)
*F01N 3/30* (2006.01)

(52) U.S. Cl.
CPC ............... *F01N 3/208* (2013.01); *F01N 3/30* (2013.01); *F01N 2270/02* (2013.01);
(Continued)

(58) Field of Classification Search
CPC combination set(s) only.
See application file for complete search history.

(56) References Cited

U.S. PATENT DOCUMENTS 6,470,673 B1 * 10/2002 van Nieuwstadt ..........................
B01D 53/9495
60/303
9,057,304 B2 * 6/2015 Huthwohl ............. F01N 3/2066
(Continued)

FOREIGN PATENT DOCUMENTS

| CN | 101798946 A | 8/2010 |
| CN | 101798946 B | 12/2012 |

(Continued)

OTHER PUBLICATIONS

International Patent Application No. PCT/CN2020/077733; Int'l Search Report; dated Jun. 8, 2020; 2 pages.

*Primary Examiner* — Binh Q Tran
(74) *Attorney, Agent, or Firm* — BakerHostetler

(57) ABSTRACT

A diesel engine high pressure SCR ventilation and voltage stabilisation system, comprising an SCR reactor (10), an air intake pipeline (20) and an exhaust pipeline (30) respectively connected to an air inlet and an exhaust outlet of the SCR reactor, a pressure difference sensing apparatus (40), and a control apparatus, a first control valve (21) being arranged on the air intake pipeline (20) and a second control valve (31) being arranged on the exhaust pipeline (30), and the control apparatus being connected to the pressure difference sensing apparatus (40), the first control valve (21), and the second control valve (31). The control apparatus controls the first and second control valves such that the (Continued)

pressure difference between the SCR reactor and the exhaust side of the diesel engine remains in a predetermined pressure difference range. The present system implements rapid ventilation and ensures precise control and stabilisation of pressure difference.

10 Claims, 1 Drawing Sheet

(52) U.S. Cl.
CPC ...... *F01N 2550/14* (2013.01); *F01N 2560/08* (2013.01); *F01N 2610/02* (2013.01); *F01N 2610/08* (2013.01)

(56) References Cited

U.S. PATENT DOCUMENTS

| | | | |
|---|---|---|---|
| 9,140,166 B1* | 9/2015 | Nelson | B01D 53/9495 |
| 9,255,511 B2* | 2/2016 | Watanabe | F01N 3/023 |
| 2004/0047783 A1* | 3/2004 | Huber | B01D 53/9495 |
| | | | 423/235 |
| 2008/0282681 A1* | 11/2008 | Katou | F01N 13/0097 |
| | | | 60/286 |
| 2015/0052878 A1* | 2/2015 | Qi | F01N 13/0093 |
| | | | 60/287 |
| 2015/0110678 A1 | 4/2015 | Stelzer | |
| 2015/0258482 A1 | 9/2015 | Qi et al. | |
| 2017/0145884 A1* | 5/2017 | Fukui | F01P 5/02 |

FOREIGN PATENT DOCUMENTS

| | | |
|---|---|---|
| CN | 104411937 A | 3/2015 |
| CN | 105114158 A | 12/2015 |
| CN | 104411937 B | 10/2016 |
| CN | 205677733 U | 11/2016 |
| CN | 105114158 B | 7/2017 |
| CN | 206325405 U | 7/2017 |
| CN | 206397567 U | 8/2017 |
| CN | 109046023 A | 12/2018 |
| CN | 109989806 A | 7/2019 |
| CN | 109046023 B | 12/2020 |
| CN | 109989806 B | 2/2021 |
| DK | 2894307 T3 | 4/2018 |
| EP | 2894307 A1 | 7/2015 |
| EP | 2894307 B1 | 1/2018 |
| JP | 2014-031756 A | 2/2014 |
| JP | 5539461 B2 | 7/2014 |
| KR | 2014-0041098 A | 4/2014 |
| KR | 2015-0035765 A | 4/2015 |
| KR | 2016-0102649 A | 8/2016 |
| KR | 2017-0099131 A | 8/2017 |
| KR | 2017-0114488 A | 10/2017 |
| KR | 10-1818262 B1 | 2/2018 |
| KR | 10-2012801 B1 | 8/2019 |
| KR | 10-2154363 B1 | 9/2020 |
| KR | 10-2154377 B1 | 9/2020 |
| KR | 10-2225916 B1 | 3/2021 |
| WO | WO 2014/020944 A1 | 2/2014 |
| WO | WO 2020/177707 A1 | 9/2020 |

* cited by examiner

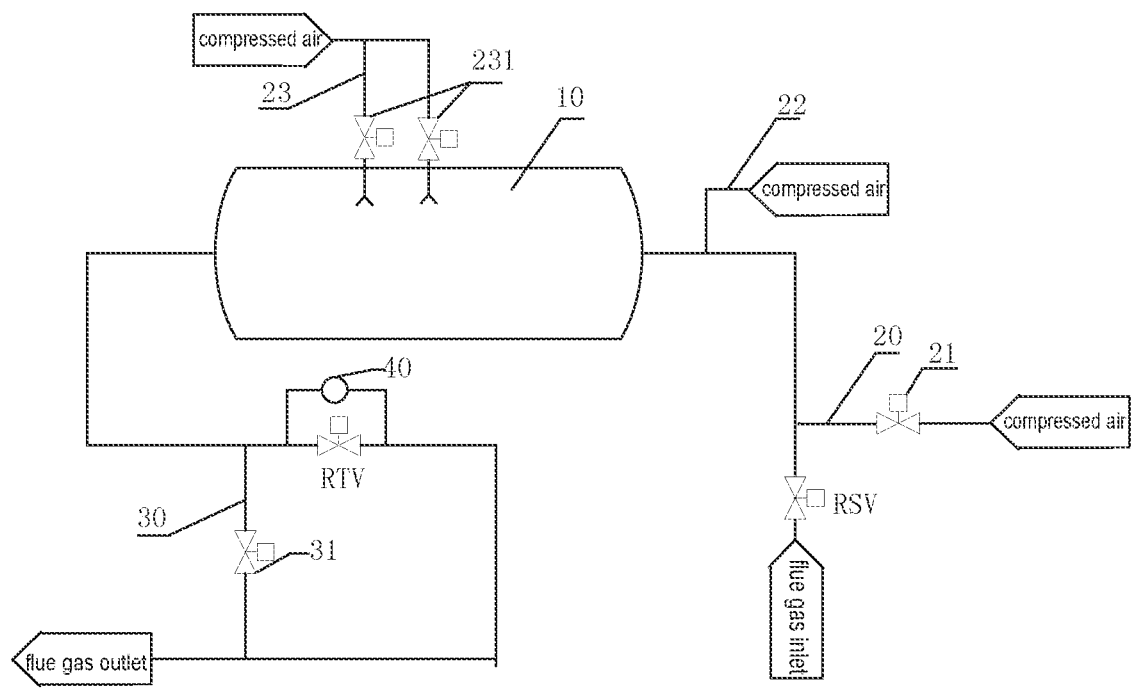

DIESEL ENGINE HIGH PRESSURE SCR VENTILATION AND PRESSURE STABILIZATION SYSTEM

CROSS-REFERENCE TO RELATED APPLICATIONS

This application is the National Stage of International Patent Application No. PCT/CN2020/077733, filed on Mar. 4, 2020, which claims the priority to Chinese Patent Application No. 201910160976.8, filed on Mar. 4, 2019, the disclosures of which are incorporated herein by reference in their entireties.

BACKGROUND

The present invention relates to the technical field of diesel engine exhaust gas treatment, and more specifically to a diesel engine high pressure SCR ventilation and pressure stabilization system.

The use of SCR (Selective Catalytic Reduction) is the mainstream technology for post-treatment of NOX exhaust gas from marine diesel engines. The existing SCR ventilation device usually uses a throttle orifice plate installing at the inlet and outlet of the compressed air, such that the compressed air is continuously purged, but this structure is poor in sealing performance and has disadvantages in slow ventilation speed, high air consumption, and unstable system.

Therefore, there is a need to provide an improved diesel engine high pressure SCR ventilation and pressure stabilization system to at least partially solve the above-mentioned problems.

SUMMARY

A series of simplified forms of concepts are introduced into the portion of Summary, which would be further illustrated in the portion of the detailed description. The Summary of the present invention does not mean attempting to define the key features and essential technical features of the claimed technical solution, let alone determining the protection scope thereof.

In order to at least partially solve the above problems, the present invention provides a diesel engine high pressure SCR ventilation and pressure stabilization system, which comprises:

a SCR reactor configured to denitrify from exhaust gas of the diesel engine;

an air intake pipeline connected to an air inlet of the SCR reactor, configured to circulate compressed air, and provided with a first control valve;

an exhaust pipeline connected to an air outlet of the SCR reactor and provided with a second control valve;

a pressure difference sensing device configured to detect a difference value between gas pressure within the SCR reactor and pressure on an exhaust side of the diesel engine; and a control device connected to the pressure difference sensing device, the first control valve, and the second control valve:

wherein, the control device controls the opening of the first control valve and the second control valve, such that the SCR ventilation and pressure stabilization system starts to ventilate, and the exhaust gas of the SCR reactor, the air intake pipeline, and the exhaust pipeline is pushed by compressed air entering from the air intake pipeline so as to be discharged from the exhaust pipeline:

the control device closes the second control valve after the ventilation of the SCR ventilation and pressure stabilization system is completed, and controls a flow rate of the compressed air entering the SCR reactor and whether to open the second control valve according to the pressure difference sensing device to maintain a gas pressure difference between the SCR reactor and an exhaust side of the diesel engine within a predetermined pressure difference range.

Preferably, further comprising an auxiliary air intake pipeline connected to the SCR reactor and provided with an auxiliary control valve, during the ventilation of the SCR ventilation and pressure stabilization system, the control device controls the auxiliary control valve to open, such that compressed air enters the SCR reactor to push discharge of the exhaust gas in the SCR reactor, the air intake pipeline, and the exhaust pipeline.

Preferably, a diameter of the auxiliary air intake pipeline is smaller than a diameter of the air intake pipeline.

Preferably, after the ventilation of the SCR ventilation and pressure stabilization system is completed, the control device controls the first control valve to close, and adjusts the auxiliary control valve and controls whether to open the second control valve according to the pressure difference sensing device to maintain the gas pressure difference within the predetermined pressure difference range.

Preferably, the auxiliary air intake pipeline includes a first auxiliary air intake pipeline on which is provided with an electromagnetic valve connected to the control device and configured to adjust a flow rate of compressed air entering the SCR reactor.

Preferably, the first auxiliary air intake pipeline is a urea atomized air pipeline.

Preferably, the auxiliary air intake pipeline includes a second auxiliary air intake pipeline on which is provided with a soot blowing valve connected to the control device and configured to adjust a flow rate of compressed air entering the SCR reactor.

Preferably, when a detection value of the pressure difference sensor sensing device is higher than the predetermined pressure difference range, the control device opens the second control valve.

Preferably, the SCR reactor has an inlet high temperature valve and an outlet high temperature valve, and the control device controls the first control valve and the second control valve to open in the state where the inlet high temperature valve and the outlet high temperature valve are closed.

Preferably, the control device controls the diesel engine SCR ventilation and pressure stabilization system to ventilate for a predetermined ventilation time, which is set according to a cross-sectional area and/or length of the SCR reactor, the air intake pipeline and the exhaust pipeline.

According to the diesel engine SCR ventilation and pressure stabilization system of the present invention, the control device controls the opening of the first control valve and the second control valve, such that the SCR ventilation and pressure stabilization system starts to ventilate, and the exhaust gas of the SCR reactor, the air intake pipeline, and the exhaust pipeline is pushed by the compressed air entering from the air intake pipeline to be discharged from the exhaust pipeline. After the ventilation of the SCR ventilation and pressure stabilization system is completed, the control device closes the second control valve, and controls the flow rate of compressed air entering the SCR reactor and whether to open the second control valve according to the pressure difference sensing device to maintain a gas pressure difference between the SCR reactor and an exhaust side of the diesel engine within a predetermined pressure difference range, which implements rapid ventilation, and ensures precise control of pressure difference and stabilization of pressure and thereby improves the stability of the system.

BRIEF DESCRIPTION OF THE DRAWINGS

The following drawings are hereby incorporated as part of the present invention for the purpose of understanding the present invention. Embodiments of the present invention and descriptions thereof are shown in the accompanying drawings for explaining the device and principle of the present invention. In the drawing, FIG. 1 is a schematic structural diagram of a diesel engine high pressure SCR ventilation and pressure stabilization system according to a preferred embodiment of the present invention.

DETAILED DESCRIPTION

In the following description, numerous specific details are set forth in order to provide a more thorough understanding of the present invention. However, it is obvious to those skilled in this art that the present invention may be implemented without one or more of these details. Some technical features well-known in this art are not described in other examples in order to avoid confusion with the present invention.

In order to thoroughly understand the present invention, a detailed structure will be presented in the following description to illustrate the present invention. Obviously, the implementation of the present invention is not limited to the specific details familiar to those skilled in the art. The preferred embodiments of the present invention are described in detail as follows. However, in addition to these detailed descriptions, the present invention may also have other embodiments, which should not be interpreted as being limited to the embodiments presented here.

It should be understood that the terms used herein are intended to describe particular embodiments only and are not intended to be a limitation of the invention. The singular forms "a", "one" and "the" are also intended to include the plural forms as well, unless the context clearly indicates otherwise. The terms "comprising" and/or "including" when used in this specification, indicate the presence of the features, wholes, steps, operations, elements, and/or components, but do not exclude the presence or addition of one or more other features, wholes, steps, operations, elements, components, and/or combinations thereof. The terms "above", "below", "front", "after" "left", "right" and similar expressions used in this invention are for illustrative purposes only and are not intended to be limiting.

Hereinafter, respective specific embodiments of the present invention will be described in more detail with reference to the accompanying drawings. These drawings show representative embodiments of the present invention and are not intended to limit the present invention.

FIG. 1 is a schematic structural diagram of a diesel engine high pressure SCR ventilation and pressure stabilization system according to a preferred embodiment of the present invention.

The diesel engine high pressure SCR ventilation and pressure stabilization system according to the present invention comprises a SCR reactor 10, an air intake pipeline 20, an exhaust pipeline 30, a pressure difference sensing device 40 and a control device.

The SCR reactor 10 is used to denitrify from exhaust gas of the diesel engine. The SCR reactor 10 generally has a catalyst (e.g., ammonia) therein, which usually undergoes a reduction reaction with NOx in the flue gas at a temperature range of 250° C. to 400° C., and the products are $N_2$ and $H_2O$. The temperature at which the reduction reaction occurs varies due to different catalysts.

The SCR reactor 10 has a working state and an off-working state. What needs to be explained here is that the working state refers to the state in which the SCR reactor 10 performs denitrification treatment on the exhaust gas of the diesel engine, and the start of the working state is usually controlled by the control system of the diesel engine. For example, when an operator presses the start button for starting SCR, the inlet high temperature valve RSV and the outlet high temperature valve RTV of the SCR reactor 10 are opened in response to the diesel engine control signal, and the exhaust gas of the diesel engine (which can also be called the flue gas as shown in FIG. 1) enters the SCR reactor 10 through the flue gas inlet and undergoes a reduction reaction with NH3 generated by the decomposition of the urea solution under the action of the catalyst to remove nitrogen. The switching of the SCR reactor 10 from the working state to the off-working state can also be controlled by the control system of the diesel engine. It can be understood that the operator presses the stop button for stopping the SCR, and the inlet high temperature valve RSV and the outlet high temperature valve RTV of the SCR reactor 10 are closed in response to the diesel engine control signal. In other words, the inlet high temperature valve RSV and the outlet high temperature valve RTV of the SCR reactor 10 are opened, that is, the SCR reactor 10 is in the working condition, and the inlet high temperature valve RSV and the outlet high temperature valve RTV of the SCR reactor 10 are closed, that is, the SCR reaction 10 is in the off-working state. It should be noted that when the control device of the diesel engine high pressure SCR ventilation and pressure stabilization system detects the close signal of the inlet high temperature valve RSV and the outlet high temperature valve RTV of the SCR reactor 10, the control device controls the diesel engine high pressure SCR ventilation and pressure stabilization system to start ventilation. The control process of the control device will be described in detail below.

The air intake pipeline 20 is located upstream of the air inlet of the SCR reactor 10 for the circulation of compressed air. A first control valve 21 is disposed on the air intake pipeline 20. The exhaust pipeline 30 is located downstream of the air outlet of the SCR reactor 10. A second control valve 31 is disposed on the exhaust pipeline 30. The cross-sectional area of the air intake pipeline 20 and the exhaust pipeline 30 is generally circular. Therefore, the flow rate of compressed air per unit time is related to the diameter of the air intake pipeline 20 and the exhaust pipeline 30.

The pressure difference sensing device 40 is used to detect the difference value between the gas pressure in the SCR reactor 10 and the pressure on the exhaust side of the diesel engine. As shown in FIG. 1, the pressure difference sensing device 40 can be connected in parallel with the outlet high temperature valve RTV of the SCR reactor 10.

The control device is connected to the pressure difference sensing device 40, the first control valve 21 and the second control valve 31, respectively. The control process of the control device will be described in detail below.

Specifically, the control device controls the first control valve 21 and the second control valve 31 to open, and the diesel engine high pressure SCR ventilation and pressure stabilization system starts ventilation. In combination with the above, it can be understood that the control device controlling the opening of the first control valve 21 and the second control valve 31 can be triggered by the closing of the inlet high temperature valve and the outlet high temperature valve. Therefore, the exhaust gas of the SCR reactor 10, the air intake pipeline 20, and the exhaust pipeline 30 is pushed by the compressed air entering from the air intake pipeline 20 to be discharged from the exhaust pipeline 30, and finally discharged from the flue gas outlet. It should be noted that, in the ventilating phase of the diesel engine high pressure SCR ventilation and pressure stabilization system, although the pressure difference sensing device 40 is always working, the second control valve 31 is opened all the time at this stage and is not turned off by the control device according to the detection value of the pressure difference sensing device 40, which is different from the stage after the completion of the ventilation of the diesel engine high pressure SCR ventilation and pressure stabilization system described later.

Then, the control device controls the diesel engine high pressure SCR ventilation and pressure stabilization system to perform ventilation for a predetermined ventilation time, which can be set in advance based on the cross-sectional area and/or length of the SCR reactor 10, the air intake pipeline 20 and the exhaust pipeline 30. For example, a longer and/or thinner (smaller cross-sectional area) air intake pipeline 20 and exhaust pipeline 30 will require a longer predetermined ventilation time, and conversely, a shorter and/or thicker (larger cross-sectional area) air intake pipeline 20 and exhaust pipeline 30 will require a shorter predetermined ventilation time.

After the ventilation of the diesel engine high pressure SCR ventilation and pressure stabilization system is completed, the control device closes the second control valve 31, and controls the flow rate of compressed air entering the SCR reactor 10 and whether to open the second control valve 31 according to the pressure difference sensing device 40 to maintain the gas pressure in the SCR reactor 10 within a predetermined pressure range. The gas pressure in the SCR reactor 10 is required to be higher than the pressure on the exhaust side of the diesel engine. Depending on the load of the diesel engine, the pressure on the exhaust side of the diesel engine is usually 2 bar-4 bar. The pressure difference between the pressures of the SCR reactor 10 and the exhaust side of the diesel engine usually ranges from 0.05 to 0.25 bar, which can prevent the gas on the diesel engine side from flowing back into the SCR reactor 10 again, which otherwise would cause an instable system. Specifically, after the ventilation of the diesel engine high pressure SCR ventilation and pressure stabilization system is completed, that is, after the ventilation process continues for a predetermined ventilation time, the control device closes the second control valve 31, but the first control valve 21 is still in an open state. At this time, it can be understood that after the ventilation is completed, the pressure in the SCR reactor 10 is usually lower than the pressure on the exhaust side of the diesel engine, and the compressed air is supplemented into the SCR reactor 10 through the air intake pipeline 20 to reach the predetermined pressure range. The compressed air then continues to be delivered through the air intake pipeline 20. When the detection value of the pressure difference sensing device 40 is higher than the predetermined differential pressure range, that is, the gas pressure in the SCR reactor 10 exceeds the predetermined pressure range, the control device opens the second control valve 31 to exhaust the gas so as to maintain the pressure difference value detected by the pressure difference sensing device 40 within a predetermined pressure difference range, namely, causing the gas pressure in the SCR reactor 10 to maintain within the predetermined pressure range.

In order to allow the diesel engine high pressure SCR ventilation and pressure stabilization system to complete gas exchange faster, the system further comprises an auxiliary air intake pipeline connected to the SCR reactor 10. The auxiliary air intake pipeline is provided with an auxiliary control valve. When the diesel engine high pressure SCR ventilation and pressure stabilization system performs a ventilation, the control device controls the auxiliary control valve to open, which can be understood as that the first control valve 21 and auxiliary control valve are both opened during the ventilating phase, to cause the compressed air to enter the SCR reactor 10, thereby pushing the discharge of the exhaust gas of the SCR reactor 10, the air intake pipeline 20, and the exhaust pipeline 30.

In order to precisely control the flow rate of the compressed air entering the SCR reactor 10, the maximum diameter of the auxiliary air intake pipeline may be smaller than the maximum diameter of the air intake pipeline. In other words, the flow rate through the air intake pipeline per unit time is different from the flow rate through the auxiliary air intake pipeline. The auxiliary air intake pipeline is usually also arranged as a round pipe, that is, the cross-sectional area thereof is circular. Then, it can also be understood that the diameter of the auxiliary air intake pipeline is smaller than the diameter of the air intake pipeline.

Preferably, as can be seen from the above, both the first control valve 21 and the auxiliary control valve are opened to complete the ventilation faster during the gas exchange stage of the diesel engine high pressure SCR ventilation and pressure stabilization system. Then, after the ventilation of the diesel engine high pressure SCR ventilation and pressure stabilization system is completed, the control device controls the first control valve 21 to close, but the auxiliary control valve is still opened. The control device, according to the pressure difference sensing device 40, adjusts the auxiliary control valve and controls whether to open the second control valve 31 to maintain the gas pressure in the SCR reactor 10 within a predetermined pressure range. Specifically, the process of maintaining the predetermined pressure difference in the diesel engine high pressure SCR ventilation and pressure stabilization system with the auxiliary air intake pipeline is achieved by adjusting the auxiliary control valve to supply the compressed air via the auxiliary air inlet pipeline and exhausting the gas through the opening of the second control valve 31.

Continuing with reference to FIG. 1, the auxiliary air intake pipeline may include a first auxiliary air intake pipeline 22 on which is provided with an electromagnetic valve connected to the control device and configured to adjust the flow rate of the compressed air entering the SCR reactor 10. Preferably, the first auxiliary intake pipeline 22 is a urea atomized air pipeline. It should be explained that the urea atomized air pipeline is only used to transport the compressed air, but the compressed air delivered through the urea atomized air pipeline may be used to atomize urea in the working state of the SCR reactor 10.

The auxiliary air intake pipeline may also include a second auxiliary air intake pipeline 23 on which is provided with a soot blowing valve 231 connected to the control device and configured to adjust the flow rate of the compressed air entering the SCR reactor 10.

Unless otherwise defined, the technical and scientific terms used herein have the same meanings as commonly understood by those skilled in the technical field of the present invention. The terms used herein are only for describing specific implementation purposes and are not intended to limit the present invention. The terms such as "part" and "portion" appearing herein can represent a single part or a combination of multiple parts. The terms such as "arranged", "provided" and the like appearing herein can denote that one component is directly attached to another component, or that one component is attached to another component through an intermediate component. The features described in one embodiment herein can be applied to another embodiment alone or in combination with other features, unless the feature is not applicable in the other embodiment or otherwise stated.

The present invention has been described by the above embodiments, but it is to be understood that the embodiments are for the purpose of illustration and explanation only, and are not intended to limit the present invention within the scope of the embodiments described herein. Furthermore, those skilled in the art can understand that the present invention is not limited to the above embodiments. Various variations and modifications can be made according to the teachings of the present invention. These variations and modifications may fall within the protection scope of the present invention as defined in the appended claims and their equivalents.

What is claimed is:

1. A diesel engine high pressure SCR ventilation and pressure stabilization system, characterized by, comprising:
   an SCR reactor configured to denitrify from exhaust gas of the diesel engine;
   an air intake pipeline connected to an air inlet of the SCR reactor for circulation of compressed air and provided with a first control valve;
   an exhaust pipeline connected to an air outlet of the SCR reactor and provided with a second control valve;
   a pressure difference sensing device configured to detect a difference value between gas pressure in the SCR reactor and pressure on an exhaust side of the diesel engine; and
   a control device connected to the pressure difference sensing device, the first control valve, and the second control valve;
   wherein, the control device is configured to control the opening of the first control valve and the second control valve such that the SCR ventilation and pressure stabilization system starts to ventilate, and exhaust gas of the SCR reactor, the air intake pipeline, and the exhaust pipeline is pushed by the compressed air entering from the air intake pipeline so as to be discharged from the exhaust pipeline;
   the control device is configure to close the second control valve after the ventilation of the SCR ventilation and pressure stabilization system is completed, and control a flow rate of the compressed air entering the SCR reactor and whether to open the second control valve according to the pressure difference sensing device to maintain a gas pressure difference between the SCR reactor and an exhaust side of the diesel engine within a predetermined pressure difference range.

2. The diesel engine high pressure SCR ventilation and pressure stabilization system according to claim 1, characterized by, further comprising an auxiliary air intake pipeline connected to the SCR reactor and provided with an auxiliary control valve, during the ventilation of the SCR ventilation and pressure stabilization system, the control device controls the auxiliary control valve to open, such that compressed air enters the SCR reactor to push discharge of the exhaust gas in the SCR reactor, the air intake pipeline, and the exhaust pipeline.

3. The diesel engine high pressure SCR ventilation and pressure stabilization system according to claim 2, characterized in that: a diameter of the auxiliary air intake pipeline is smaller than a diameter of the air intake pipeline.

4. The diesel engine high pressure SCR ventilation and pressure stabilization system according to claim 3, characterized in that: after the ventilation of the SCR ventilation and pressure stabilization system is completed, the control device controls the first control valve to close, and adjusts the auxiliary control valve and controls whether to open the second control valve according to the pressure difference sensing device to maintain the gas pressure difference within the predetermined pressure difference range.

5. The diesel engine high pressure SCR ventilation and pressure stabilization system according to claim 4, characterized in that: the auxiliary air intake pipeline includes a first auxiliary air intake pipeline on which is provided with an electromagnetic valve connected to the control device and configured to adjust a flow rate of compressed air entering the SCR reactor.

6. The diesel engine high pressure SCR ventilation and pressure stabilization system according to claim 5, characterized in that: the first auxiliary air intake pipeline is a urea atomized air pipeline.

7. The diesel engine high pressure SCR ventilation and pressure stabilization system according to claim 4, characterized in that: the auxiliary air intake pipeline includes a second auxiliary air intake pipeline on which is provided with a soot blowing valve connected to the control device and configured to adjust a flow rate of compressed air entering the SCR reactor.

8. The diesel engine high pressure SCR ventilation and pressure stabilization system according to claim 1, characterized in that: when a detection value of the pressure difference sensing device is higher than a predetermined pressure difference range, the control device opens the second control valve.

9. The diesel engine high pressure SCR ventilation and pressure stabilization system according to claim 1, characterized in that: the SCR reactor has an inlet high temperature valve and an outlet high temperature valve, and the control device controls the first control valve and the second control valve to open in the state where the inlet high temperature valve and the outlet high temperature valve are closed.

10. The diesel engine high pressure SCR ventilation and pressure stabilization system according to claim 1, characterized in that: the control device controls the diesel engine SCR ventilation and pressure stabilization system to ventilate for a predetermined ventilation time, which is set according to a cross-sectional area and/or length of the SCR reactor, the air intake pipeline and the exhaust pipeline.

* * * * *